(12) United States Patent
Tyan et al.

(10) Patent No.: US 10,562,478 B2
(45) Date of Patent: Feb. 18, 2020

(54) STRENGTHENING STRUCTURE OF A VEHICLE

(71) Applicant: Ford Global Technologies, LLC, Dearborn, MI (US)

(72) Inventors: Tau Tyan, Northville, MI (US); Robert Ralph Armitage, Howell, MI (US); Nial James Wykes, Grosse Pointe Farms, MI (US); Raj Jayachandran, Canton, MI (US); Wan-San Chiu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 15/903,107

(22) Filed: Feb. 23, 2018

(65) Prior Publication Data

US 2019/0263345 A1 Aug. 29, 2019

(51) Int. Cl.
| | |
|---|---|
| *B60R 21/04* | (2006.01) |
| *B60R 19/18* | (2006.01) |
| *B60R 19/26* | (2006.01) |
| *B60R 19/34* | (2006.01) |
| *F16F 7/12* | (2006.01) |
| *B21C 1/16* | (2006.01) |
| *B62D 21/15* | (2006.01) |
| *B62D 65/02* | (2006.01) |
| *B62D 21/00* | (2006.01) |
| *B62D 25/00* | (2006.01) |
| *B60R 19/02* | (2006.01) |

(52) U.S. Cl.
CPC ............ *B60R 21/04* (2013.01); *B21C 1/16* (2013.01); *B60R 19/02* (2013.01); *B60R 19/18* (2013.01); *B60R 19/26* (2013.01); *B62D 21/00* (2013.01); *B62D 21/15* (2013.01); *B62D 21/155* (2013.01); *B62D 25/00* (2013.01); *B62D 65/024* (2013.01); *B60R 2019/1866* (2013.01); *B60R 2021/0414* (2013.01); *B60R 2021/0442* (2013.01); *F16F 7/121* (2013.01)

(58) Field of Classification Search
CPC ... B60R 21/04; B60R 2019/264; B60R 19/34; B60R 2021/414; B60R 2021/0442; F16F 7/121; F16F 7/122; F16F 1/3737
USPC ...... 296/39.1, 39.3, 187.03, 187.05; 188/377
See application file for complete search history.

(56) References Cited

U.S. PATENT DOCUMENTS

| | | | |
|---|---|---|---|
| 3,638,992 A | 2/1972 | Forshee | |
| 5,399,406 A * | 3/1995 | Matsuo | B32B 3/12 428/57 |
| 6,588,830 B1 | 7/2003 | Schmidt et al. | |
| 6,681,907 B2 | 1/2004 | Le | |
| 6,705,653 B2 | 3/2004 | Gotanda et al. | |

(Continued)

FOREIGN PATENT DOCUMENTS

| | | |
|---|---|---|
| DE | 19603953 C1 | 4/1997 |
| DE | 202016105900 U1 | 3/2017 |
| JP | H11334508 A | 12/1999 |

*Primary Examiner* — Gregory A Blankenship
(74) *Attorney, Agent, or Firm* — Vichit Chea; Price Heneveld LLP

(57) ABSTRACT

A strengthening structure of a vehicle is provided herein and includes a base having cutouts. Relief members are disposed across the base and each include a cross section having twelve or fourteen corners, a distal end, and an open proximal end in communication with a corresponding cutout.

20 Claims, 8 Drawing Sheets

(56) References Cited

U.S. PATENT DOCUMENTS

| | | | | |
|---|---|---|---|---|
| 6,752,451 B2* | 6/2004 | Sakamoto | B21C 1/22 | 29/897.2 |
| 7,694,787 B2 | 4/2010 | Kano et al. | | |
| 7,926,868 B2* | 4/2011 | Braunbeck | F16F 7/123 | 293/132 |
| 8,459,726 B2* | 6/2013 | Tyan | B60R 19/34 | 296/133 |
| 8,539,737 B2* | 9/2013 | Tyan | B62D 21/152 | 52/843 |
| 8,641,129 B2 | 2/2014 | Tyan et al. | | |
| 8,685,299 B2* | 4/2014 | Bobba | B60R 19/18 | 264/157 |
| 9,073,582 B2 | 7/2015 | Tyan et al. | | |
| 9,174,678 B2 | 11/2015 | Tyan et al. | | |
| 9,187,127 B2* | 11/2015 | Tyan | B62D 21/152 | |
| 9,533,710 B2 | 1/2017 | Cheng et al. | | |
| 9,840,281 B2 | 12/2017 | Tyan et al. | | |
| 9,845,112 B2 | 12/2017 | Tyan et al. | | |
| 2004/0178662 A1* | 9/2004 | Carroll, III | B60N 2/4249 | 296/187.03 |
| 2005/0161982 A1* | 7/2005 | Cormier | A62B 1/22 | 296/214 |
| 2005/0212328 A1* | 9/2005 | Ashmead | F16F 7/12 | 296/187.05 |
| 2006/0202493 A1* | 9/2006 | Tamura | F16F 7/12 | 293/133 |
| 2010/0109353 A1* | 5/2010 | Allen | B60R 19/18 | 293/120 |
| 2010/0225136 A1* | 9/2010 | Ogawa | B60J 5/0418 | 296/39.1 |
| 2010/0253114 A1 | 10/2010 | Ohmiya et al. | | |
| 2011/0221235 A1* | 9/2011 | Tauchi | B60R 21/04 | 296/187.05 |
| 2014/0138984 A1* | 5/2014 | Kwon | B60R 21/04 | 296/187.05 |
| 2015/0307049 A1* | 10/2015 | Kwon | B60R 21/04 | 188/377 |
| 2016/0076619 A1* | 3/2016 | Cormier | B60R 21/04 | 267/140.11 |
| 2016/0082901 A1* | 3/2016 | Bock | B60R 13/0212 | 296/187.05 |
| 2016/0375935 A1 | 12/2016 | Tyan et al. | | |
| 2017/0106915 A1* | 4/2017 | Tyan | B62D 21/152 | |
| 2017/0203790 A1* | 7/2017 | Tyan | B60R 19/26 | |
| 2017/0307137 A1* | 10/2017 | Tyan | B32B 3/12 | |
| 2018/0057060 A1* | 3/2018 | Tyan | B62D 21/15 | |
| 2018/0186323 A1* | 7/2018 | Tallapragada | B60R 21/0428 | |
| 2019/0063538 A1* | 2/2019 | Audi | F16F 7/12 | |

\* cited by examiner

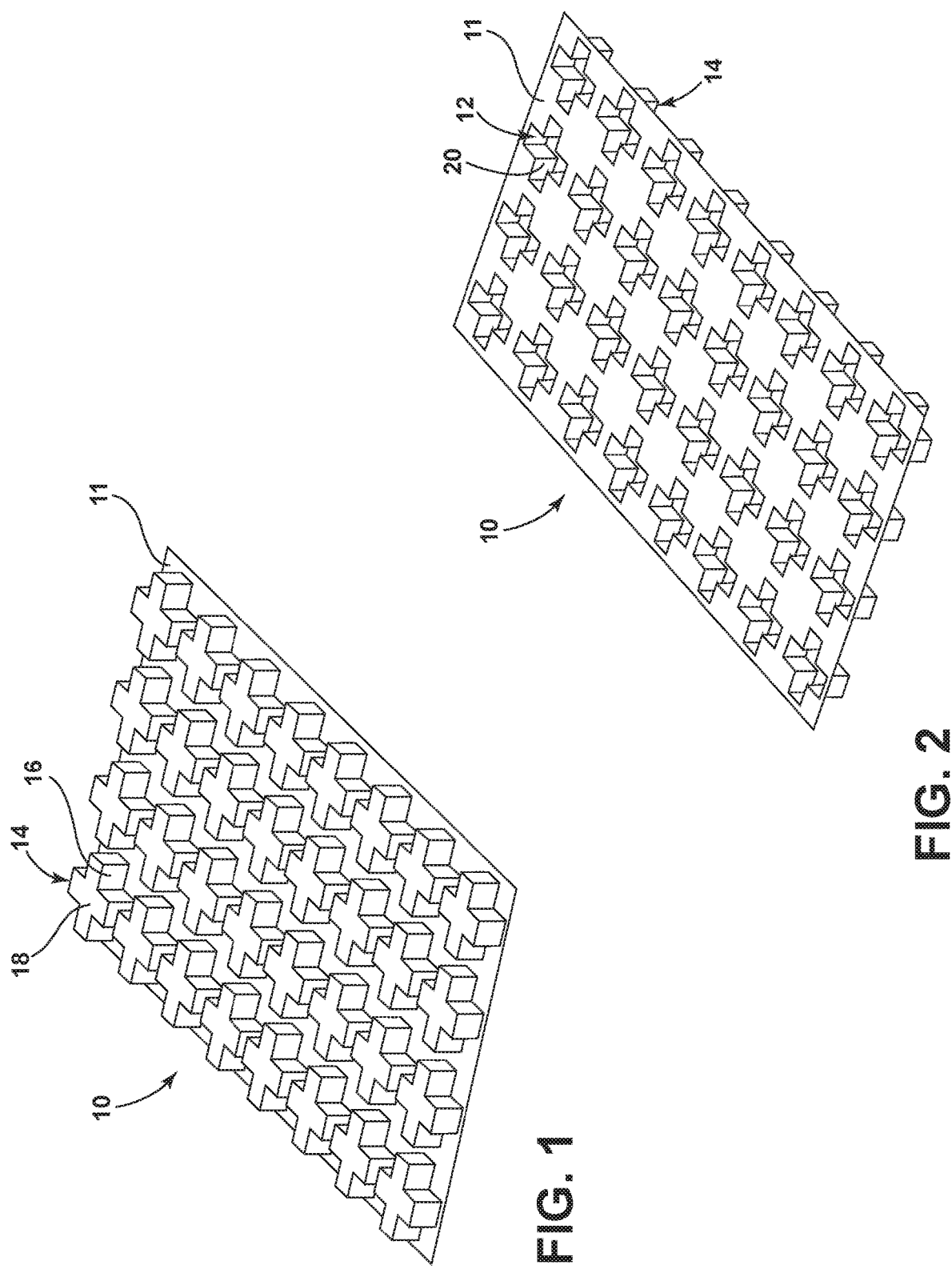

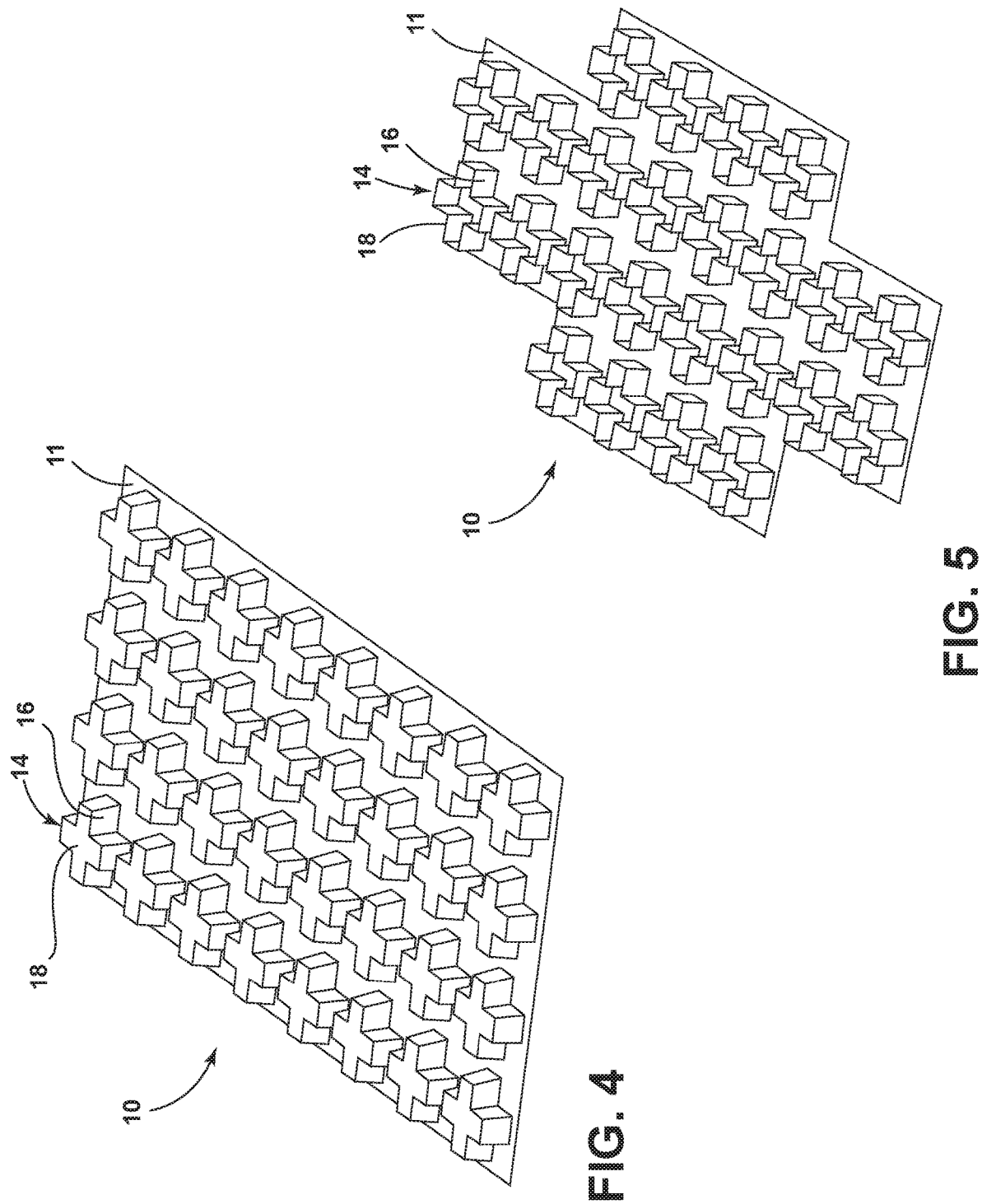

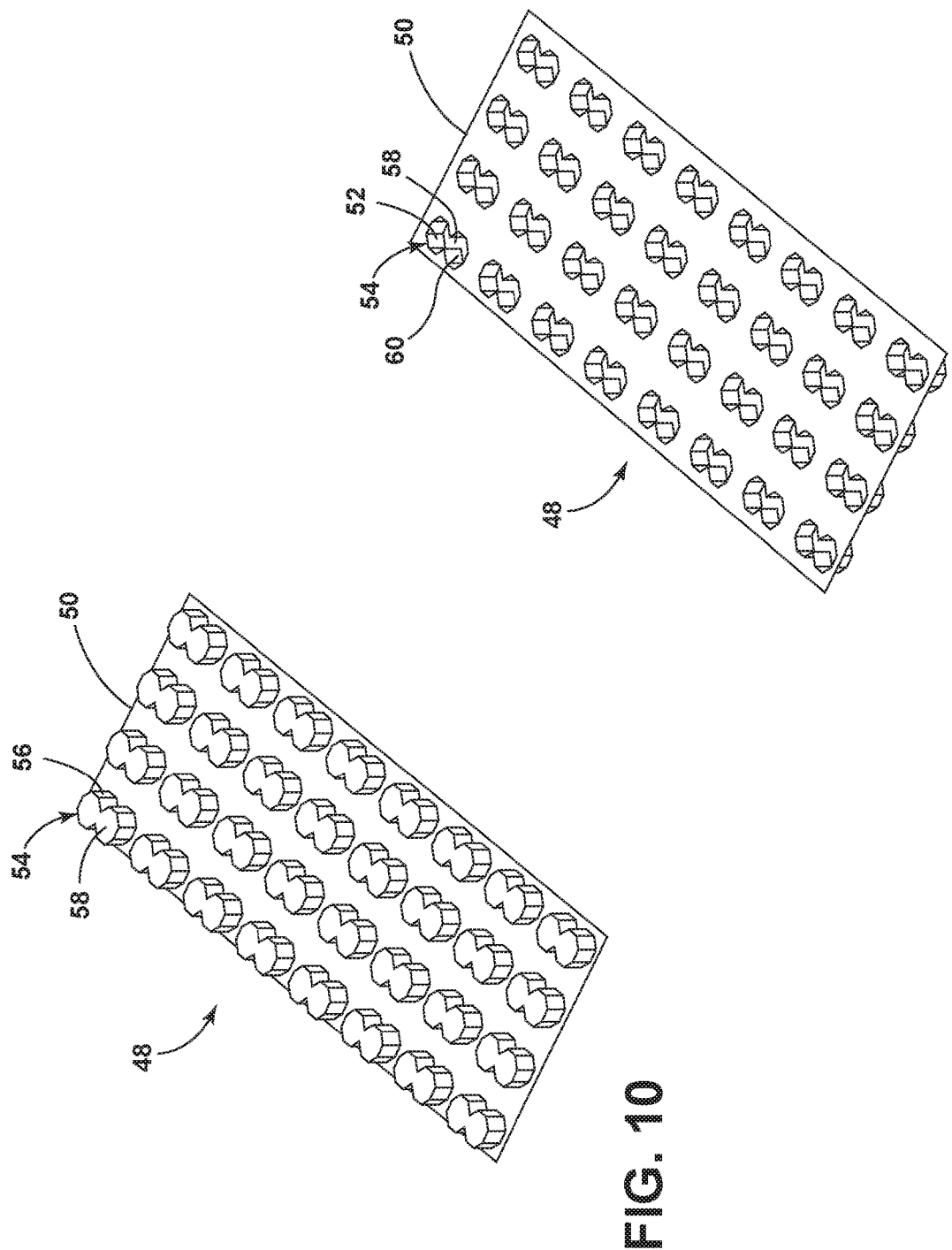

STRENGTHENING STRUCTURE OF A VEHICLE

FIELD OF THE INVENTION

The present invention generally relates to a strengthening structure of a vehicle, and more particularly, to a strengthening structure including a plurality of relief members each having a twelve- or fourteen-cornered cross section.

BACKGROUND OF THE INVENTION

When a compressive force is exerted on a strengthening structure, one or more relief members can crush in a longitudinal direction to absorb the energy of the collision. It is desirable to provide a strengthening structure with improved strength while minimizing mass per unit length and high manufacturing feasibility. The present disclosure is intended to satisfy this need.

SUMMARY OF THE INVENTION

According to a first aspect of the present invention, a strengthening structure of a vehicle is provided and includes a base having cutouts. Relief members are disposed across the base and each include a cross section having twelve or fourteen corners, a distal end, and an open proximal end in communication with a corresponding cutout.

Embodiments of the first aspect of the invention can include any one or a combination of the following features:
- the distal end is open;
- the distal end is partially open;
- the distal end is closed;
- the distal end includes a raised central portion;
- the relief members have variable height and each relief member is uniform or tapered;
- the base includes cutouts free from communication with any of the relief members;
- the relief structures have twelve-cornered cross sections shaped as a cross including a head, a tail that is longer than the head, and a pair of arms;
- the relief members are arranged across the base in rows from a first end to a second end such that the heads of the relief members of a same row all point in a common direction, and the relief members are arranged across the base in rows from a third end to a fourth end such that the heads of the relief members of the same row point in alternating opposite directions;
- the relief structures have fourteen-cornered cross sections shaped as a fourteenagon; and
- the relief structures have fourteen-cornered cross sections shaped as a star.

According to a second aspect of the present invention, a strengthening structure of a vehicle is provided and includes a base having cutouts. Uniform or tapered relief members of variable height are disposed across the base. Each relief member includes a twelve-cornered cross section having variable lengths and thicknesses, a distal end, and an open proximal end in communication with a corresponding cutout.

Embodiments of the second aspect of the invention can include any one or a combination of the following features:
- the distal end is open, partially open, or closed;
- the distal end is closed and includes a raised central portion;
- each twelve-cornered cross section is shaped as a cross including a head, a tail that is longer than the head, and a pair of arms, the relief members are arranged across the base in rows from a first end to a second end such that the heads of the relief members of a same row all point in a common direction, and the relief members are arranged across the base in rows from a third end to a fourth end such that the heads of the relief members of the same row point in alternating opposite directions; and
- the base includes cutouts free from communication with any of the relief members.

According to a third aspect of the present invention, a strengthening structure of a vehicle is provided and includes a base having cutouts. Uniform or tapered relief members of variable height are disposed across the base. Each relief member includes a fourteen-cornered cross section having variable lengths and thicknesses, a distal end, and an open proximal end in communication with a corresponding cutout.

Embodiments of the third aspect of the invention can include any one or a combination of the following features:
- the distal end is open, partially open, or closed;
- the distal end is closed and includes a raised central portion; and
- the base includes cutouts free from communication with any of the relief members.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of an exemplary embodiment of a strengthening structure with relief members each having a twelve-cornered cross section;

FIG. 2 is a bottom perspective view of the strengthening structure shown in FIG. 1;

FIG. 4 illustrates another exemplary embodiment of the strengthening structure in which the relief members are tapered toward a distal end;

FIG. 5 illustrates another exemplary embodiment of the strengthening structure in which the relief members each include an open distal end and are coupled to a planar twelve-cornered base;

FIG. 10 is a top perspective view of an exemplary embodiment of a strengthening structure with relief members each having a fourteen-cornered cross section;

FIG. 11 is a bottom perspective view of the strengthening structure shown in FIG. 10;

DETAILED DESCRIPTION OF THE PREFERRED EMBODIMENTS

Figure 3:
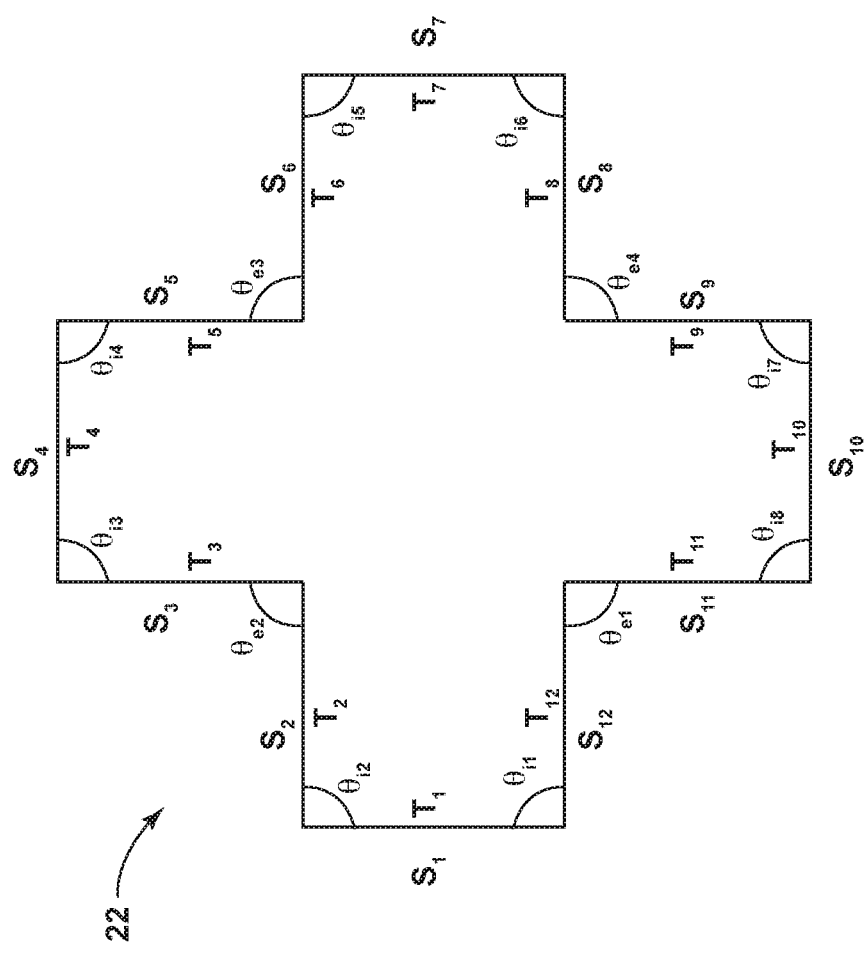
FIG. 3 illustrates a twelve-cornered cross section of a relief member according to the embodiment shown in FIGS. 1 and 2.

As required, detailed embodiments of the present invention are disclosed herein.

However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The present disclosure contemplates providing a strengthening structure including a plurality of relief members each having a sidewall with a twelve-cornered or fourteen-cornered cross section. The strengthening structure can achieve increased energy absorption and a more stable axial collapse when forces are exerted thereon. The strengthening structure can also possess improved durability and noise-vibration-harshness (NVH) performance due to work hardening on the twelve or fourteen corners. The internal and external angles associated with the twelve or fourteen corners can achieve the same strength increase as thickened corners while minimizing mass per unit length and maintaining a high manufacturing feasibility because the structure can be formed by bending, rolling, stamping, pressing, hydro-forming, molding, extrusion, cutting, and forging.

Referring to FIGS. 1-9, a strengthening structure is generally designated by reference numeral 10. The strengthening structure 10 includes a base 11 having a plurality of cutouts 12 and a plurality of relief members 14 extending from the base 11. The base 11 may be planar and each relief member 14 includes a sidewall 16 having a twelve-cornered cross section, a distal end 18 that may be closed, open, or partially open, and an open proximal end 20 in communication with a corresponding cutout 12.

Referring to FIGS. 1 and 2, the relief members 14 are evenly spaced across the base 11 and the distal end 18 of each relief member 14 is closed. However, it will be appreciated that the number and spacing of the relief members 14 are exemplary in nature and may be varied if desired. For purposes of understanding, a cross section 22 of the sidewall 16 depicted in FIGS. 1 and 2 is shown in FIG. 3. As illustrated, the cross section 22 has lengths $S_1$-$S_{12}$, thicknesses $T_1$-$T_{12}$, eight internal corners with angles $\theta_{i1}$-$\theta_{i8}$, and four external corners with angles $\theta_{e1}$-$f_{e4}$. In certain embodiments, the internal and external angles may have variable bend radii. For example, some corners may appear rounded in instances where a relatively large bend radii is selected. In the illustrated embodiment, the lengths $S_1$-$S_{12}$ and thicknesses $T_1$-$T_{12}$ are about the same. The internal and external corners are generally shown as having about the same angle. In certain embodiments, the lengths $S_1$-$S_{12}$, thicknesses $T_1$-$T_{12}$, and/or angles associated with the internal and/or external corners can be varied to a certain degree with available packaging space within a vehicle. For additional design flexibility, it is contemplated that the sidewall 16 may be substantially uniform as shown in FIGS. 1 and 2 or tapered toward the distal end 18 as shown in FIG. 4. In embodiments where the strengthening structure 10 is manufactured using a molding or stamping process, the thicknesses $T_1$-$T_{12}$ of the sidewall 16 may become thinner when moving from the proximal end 20 to the distal end 18. In other manufacturing processes, the thicknesses $T_1$-$T_{12}$ of the sidewall 16 have little to no variation.

Figures 6, 7:
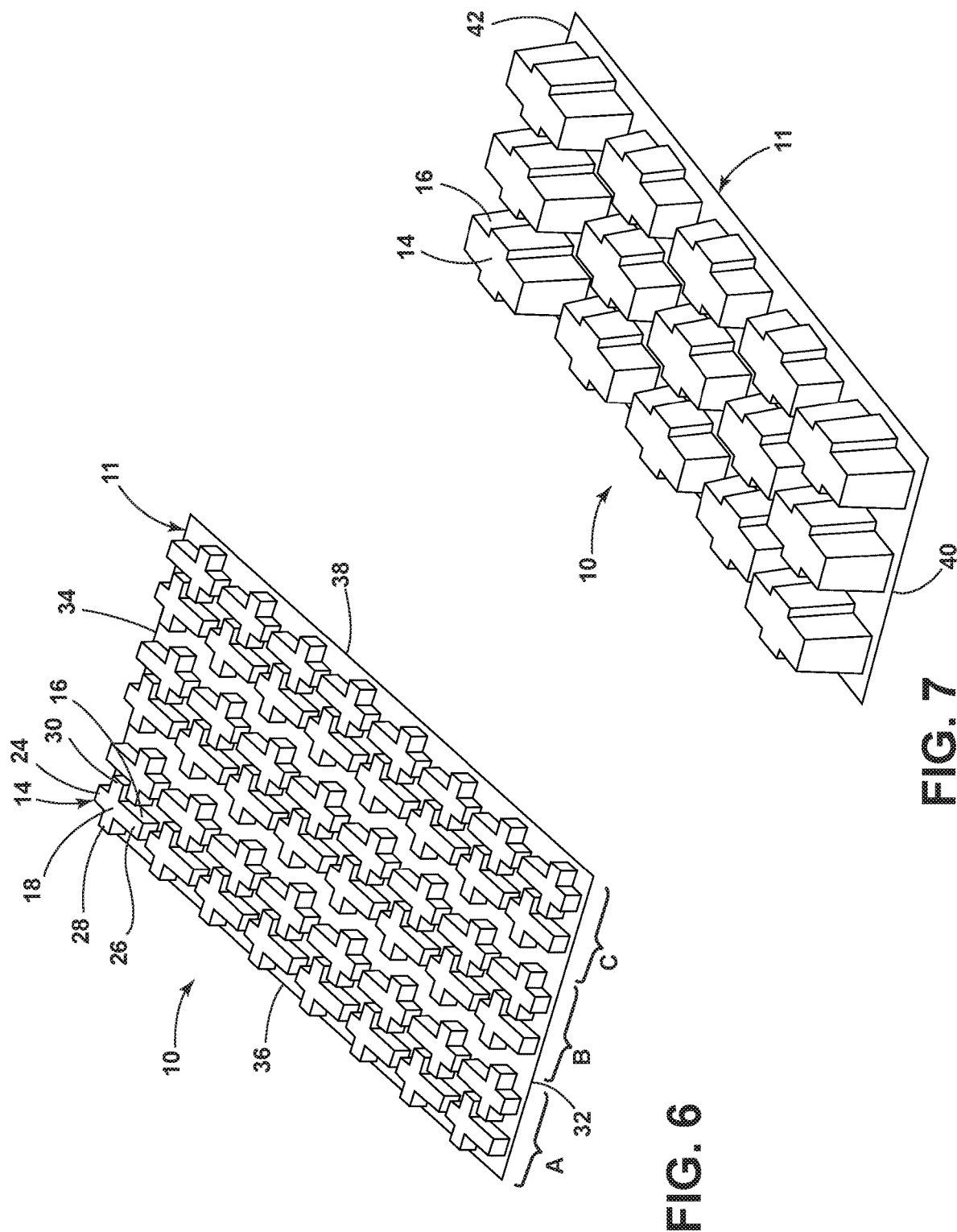
FIG. 6 illustrates another exemplary embodiment of the strengthening structure in which the relief members are shaped as crosses.
FIG. 7 illustrates another exemplary embodiment of the strengthening structure in which the relief members have variable height.

Referring to FIGS. 5-9, other exemplary embodiments of the strengthening structure 10 are shown and will be described in greater detail herein. For example, in FIG. 5, the base 11 is planar with twelve corners and the distal end 18 of each relief member 14 is open. In FIG. 6, each relief member 14 is cross-shaped and includes a head 24, a tail 26 that is longer than the head 24, and a pair of arms 28, 30 of equal length. The head 24, tail, 26, and two arms 28, 30 are defined by corresponding portions of the sidewall 16 and the distal end 18. However, in embodiments where the distal end 18 is open, the head 24, tail 26, and two arms 28, 30 may be defined exclusively by the sidewall 16. As depicted, the relief members 14 are arranged in rows across the base 11 from a first end 32 to a second end 34 such that the heads 24 of the relief members 14 of a same row all point in a common direction. Additionally, the relief members 14 are arranged in rows across the base 11 from a third end 36 to a fourth end 38 such that the heads 24 of the relief members 14 in the same row point in alternating opposite directions. In certain embodiments, the relief members 14 may be arranged in spaced-apart groupings exemplarily shown as groupings A, B, and C. Alternatively, the relief members 14 may be evenly spaced if so desired.

Figures 8, 9:
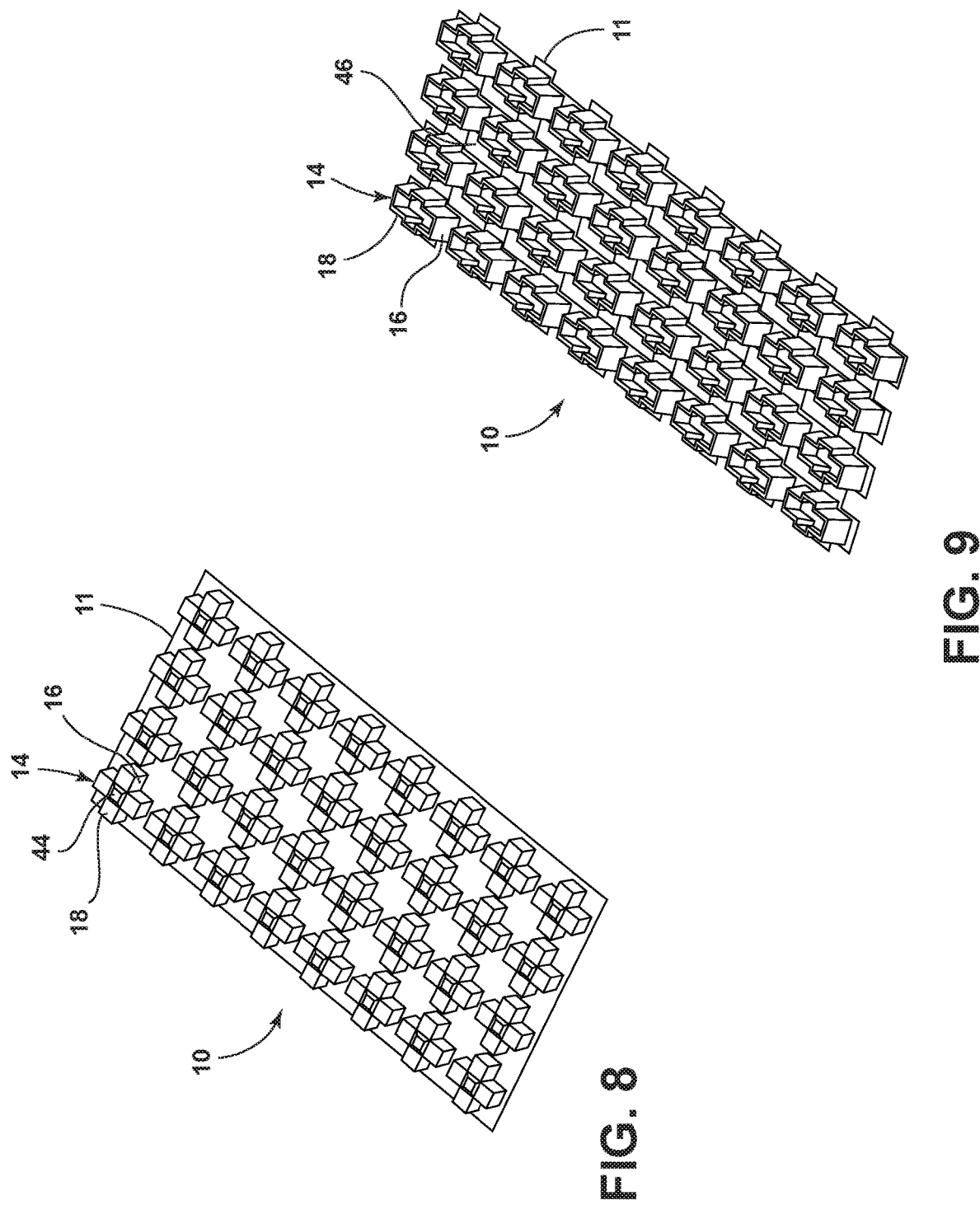
FIG. 8 illustrates another exemplary embodiment of the strengthening structure in which the relief members each include a closed distal end and a raised central portion.
FIG. 9 illustrates another exemplary embodiment of the strengthening structure in which the relief members each include a partially open distal end and are coupled to a base having cutouts free from communication with any of the relief members.

With reference to FIG. 7, the relief members 14 are shown having variable height. For example, relief members 14 located adjacent longitudinal ends 40 and 42 of the base 11 may be taller than the remaining relief members 14. In FIG. 8, the distal end 18 of each relief member 14 is closed and includes a raised central portion 44 to assist in absorbing minor impact while the remaining structure functions to absorb impact that is more severe. In FIG. 9, the distal end 18 of each relief member 14 is partially open. Also, the base 11 includes additional cutouts 46 that are free from communication with any of the relief members 14.

Referring now to FIGS. 10 and 11, an alternative strengthening structure is generally designated by reference numeral 48. The strengthening structure 48 includes a base 50 having a plurality of cutouts 52 and a plurality of relief members 54 extending from the base 50. The base 50 may be planar and each relief member 54 includes a sidewall 56 having a fourteen-cornered cross section, a distal end 58, and an open proximal end 60 in communication with a corresponding cutout 52. It will be understood that the strengthening structure 48 may benefit from some of the design flexibility described herein with respect to strengthening member 10. That is, the relief members 54 may have variable height and may be variously or evenly spaced across the base 50. Additionally or alternatively, the distal end 58 of each relief member 54 may be closed, open, or partially open. In closed or partially open embodiments, it will be understood that the distal end 58 may include raised portions of varied size and shape. Additionally or alternatively still, the sidewall 56 of each relief member 54 may be uniform or tapered. Additionally or alternatively still, the base 50 may have various shapes and/or include additional cutouts free from communication with any of the relief members 54.

Figure 12:
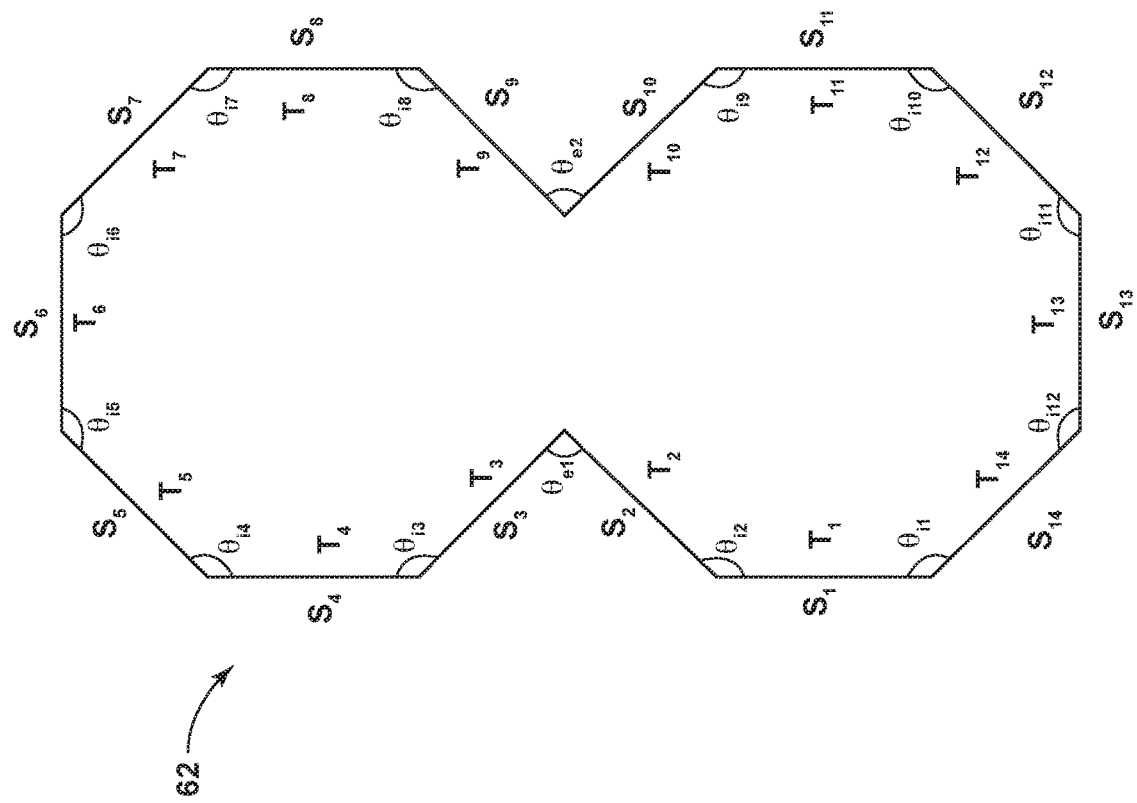
FIG. 12 illustrates a fourteen-cornered cross section of a relief member according to the embodiment shown in FIGS. 10 and 11.
Figure 13:
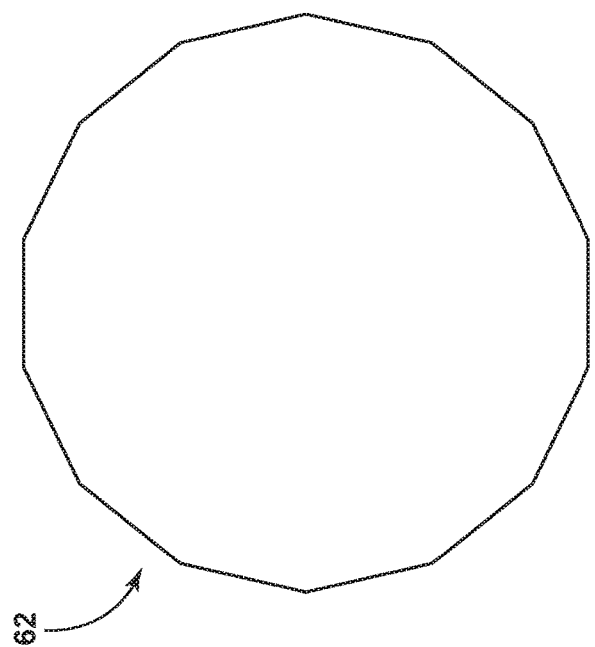
FIG. 13 illustrates a fourteen-cornered cross section in the shape of a fourteenagon.
Figure 14:
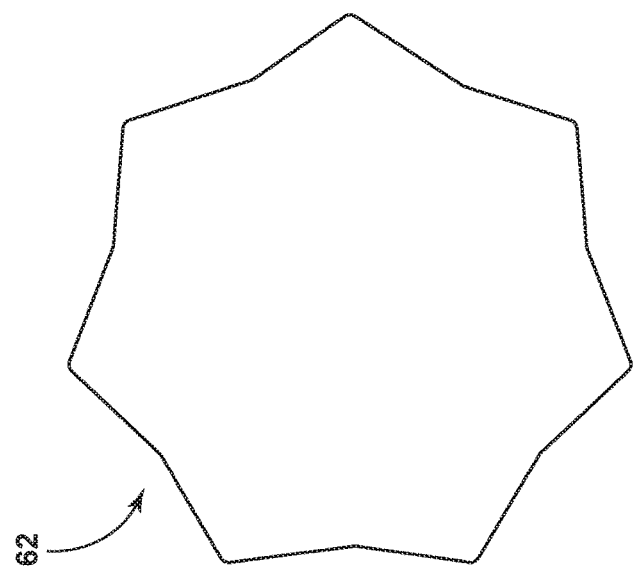
FIG. 14 illustrates a fourteen-cornered cross section in the shape of a star.

For purposes of understanding, a cross section 62 of the side wall 56 depicted in FIGS. 10 and 11 is shown in FIG. 12. As illustrated, the cross section 62 has lengths $S_1$-$S_{14}$, thicknesses $T_1$-$T_{14}$, twelve internal corners with angles $\theta_{i1}$-$\theta_{i12}$, and two external corners with angles $\theta_{e1}$ and $\theta_{e2}$. In the illustrated embodiment, the lengths $S_1$-$S_{14}$ and thicknesses $T_1$-$T_{14}$, are about the same. Likewise, the angles $\theta_{i1}$-$\theta_{i12}$ associated with the internal corners are about the same and the angles $\theta_{e1}$, $\theta_{e2}$ associated with the external corners are also about the same. In certain embodiments, the lengths $S_1$-$S_{14}$, thicknesses $T_1$-$T_{14}$, and/or angles associated with the internal and/or external corners can be varied to a certain degree with available packaging space within a vehicle. While the cross section 62 is generally shown in FIG. 12 as having an outline of a digital "8", it will be appreciated that other shapes are possible. For example, as shown in FIG. 13, the cross section 62 may be shaped as a fourteenagon. In another example, as shown in FIG. 14, the cross section 62 may be shaped as a star.

With respect to the embodiments described herein, it will be understood that while the distal end 18, 58, the proximal end 20, 60, and the base 11, 50 are generally shown as planar, the foregoing components may alternatively be uneven, curved, and/or non-planar, to assist with mating, adhering, and/or joining with surrounding structures or surfaces of the vehicle. Also, it will be understood that various polygonal shapes having twelve or fourteen corners are possible in view of the teachings provided herein. Specifically, it is contemplated that relief members 14 may be configured as dodecadons and/or stars, if desired.

Accordingly, a strengthening structure has been advantageously provided herein. The strengthening structure in accordance with the present disclosure has substantially increased strength and stiffness without requiring thicker corner portions. Beneficially, the strengthening structure has a high manufacturing feasibility and can be formed in one or multiple sections by, for example, bending, rolling, stamping, pressing, drawing, hydro-forming, molding, extrusion, cutting, and forging. Sections formed in accordance with these processes can be joined via welding, adhesive, fastening, or other known joining methods.

The strengthening structure in accordance with the present disclosure is contemplated for use with a number of vehicle structures such as, but not limited to, a front rail, a side rail, a cross member, roof structures, and other components benefitting from increased crash energy absorption.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements may be varied, and the nature or number of adjustment positions provided between the elements may be varied. It should be noted that the strengthening structure may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A strengthening structure of a vehicle, comprising:
   a base having a first plurality of cutouts;
   relief members disposed across the base and each including:
     a cross section having twelve or fourteen corners and shaped as a star;
     a distal end; and
     an open proximal end in communication with a corresponding cutout of the first plurality of cutouts.

2. The strengthening structure of claim 1, wherein the distal end is open.

3. The strengthening structure of claim 1, wherein the distal end is partially open.

4. The strengthening structure of claim 1, wherein the distal end is closed.

5. The strengthening structure of claim 4, wherein the distal end includes a raised central portion.

6. The strengthening structure of claim 1, wherein the relief members have variable height, and wherein each relief member is uniform or tapered.

7. The strengthening structure of claim 1, wherein the base includes a second plurality of cutouts free from communication with any of the relief members.

8. The strengthening structure of claim 7, wherein the second plurality of cutouts are defined to alternate between the relief members.

9. The strengthening structure of claim 7, wherein each of the second plurality of cutouts has a substantially rectangular cross-section.

10. A strengthening structure of a vehicle, comprising:
   a base having a first plurality of cutouts;
   uniform or tapered relief members of variable height disposed across the base and each including:
      a twelve-cornered cross section having variable lengths and thicknesses, the cross-section shaped as a cross including a head, a tail that is longer than the head, and a pair of arms;
      a distal end; and
      an open proximal end in communication with a corresponding cutout of the first plurality of cutouts.

11. The strengthening structure of claim 10, wherein the distal end is open, partially open, or closed.

12. The strengthening structure of claim 11, wherein the distal end is closed and includes a raised central portion.

13. The strengthening structure of claim 10, wherein the relief members are arranged across the base in rows from a first end to a second end such that the heads of the relief members of a same row all point in a common direction, and wherein the relief members are arranged across the base in rows from a third end to a fourth end such that the heads of the relief members of the same row point in alternating opposite directions.

14. The strengthening structure of claim 10, wherein the base includes a second plurality of cutouts free from communication with any of the relief members.

15. The strengthening structure of claim 14, wherein the second plurality of cutouts are defined to alternate between the relief members.

16. The strengthening structure of claim 14, wherein each of the second plurality of cutouts has a substantially rectangular cross-section.

17. A strengthening structure of a vehicle, comprising:
   a base having a first plurality of cutouts and a second plurality of cutouts;
   uniform or tapered relief members of variable height disposed across the base and each including:
      a fourteen-cornered cross section having variable lengths and thicknesses;
      a distal end; and
      an open proximal end in communication with a corresponding cutout of the first plurality of cutouts, wherein the second plurality of cutouts are free from communication with any of the relief members and are defined to alternate between the relief members.

18. The strengthening structure of claim 17, wherein the distal end is open, partially open, or closed.

19. The strengthening structure of claim 18, wherein the distal end is closed and includes a raised central portion.

20. The strengthening structure of claim 17, wherein each of the second plurality of cutouts has a substantially rectangular cross-section.

* * * * *